United States Patent Office 3,013,341
Patented Dec. 19, 1961

3,013,341
FREEZE DRYING PROCESS
Karlheinz Neumann, Koln-Bayental, Germany, assignor to National Research Corporation, Cambridge, Mass., a corporation of Massachusetts
No Drawing. Filed July 15, 1958, Ser. No. 748,603
1 Claim. (Cl. 34—5)

On freeze drying, the removal of water occurs by sublimation from frozen substances with the simultaneous effect of the vacuum. According to experience melting of the frozen material during the freeze-drying usually leads to its decomposition. It is known that to maintain a stable icy state of aggregation temperatures in close proximity to the null point are not sufficient to keep the respective material frozen. There results depending on the composition of the material to be dried a partial condensation with the formation of bubbles, even if during drying the product is kept below $-10°$ C., below $-20°$ C. and generally even if below $-30°$ C. Substances in which such low temperatures must be maintained in order to avoid condensation, bubbling and thereby damage to the freeze-dried product often make the process of freeze-drying difficult, technically expensive and requiring uneconomically long drying periods.

The new process according to the invention overcomes these difficulties and offers a possibility of drying such sensitive products considerably above the usual operating temperature limits. This is so managed that to the material to be dried is added high molecular weight material in concentrations between 0.2 to 2%. Thereby there results a remarkable improvement in the temperature of the frozen material to be dried without the occurrence of harmful condensations, foaming and decomposition. Thus it has been shown, for example, that meat extract must be kept at $-45°$ C. in the already known process if a condensation of the product would be avoided. By the process according to the invention, there resulted a considerable increase of the temperature limit by the addition of gelatin in a concentration of 0.2%. As a result condensation and foaming first occurred at $-32°$ C. Increasing the gelatin addition to 0.5% permits reaching a drying temperature of $-21°$ C. With addition of 2% gelatin a drying temperature even up to $-13.5°$ C. can be reached. If one considers the relatively high expenditure necessary to maintain the low temperature of the icy material, for example, $-40°$ C., then the progress obtained by the new invention is extremely important. Hereby for the first time an economical freeze-drying of products becomes possible, which process had to be rejected previously for the reasons already mentioned.

Also, the addition of other high molecular weight materials soluble in the respective concentrations leads to a corresponding result. Of course in this it is necessary to establish that the respective addition shows no properties incompatible with the preparation, for example with respect to its flavor or its tolerance.

By itself the addition of gelatin is known in the freeze-drying of bacteria containing solutions. Here, however, it is a matter of considerably higher concentrations on the order of magnitude of 10%. Also several other substances, for example, horse serum, skim milk, certain bacterial nutrients etc., have already been used in such high concentrations in order to increase the survival period of bacteria during the freezing of material to be dried, before the drying itself. Hereby it has been shown that only very definite, mostly albumen containing additions are useful. Others, which likewise can be used according to the present invention, remain without effect as additives to bacteria containing solutions in regard to the hoped for increase in the survival rate of the bacillus.

Instead of gelatin other high molecular weight organic substances, soluble in water, and which do not change the former properties of the eutectic solution can be added before freezing. For example, agar agar, pectin, or polyvinyl pyrollidine can be added.

Also meat extract is chosen only as a representative drying material. The intent of the invention consists essentially in that an economical drying of substances with low eutectic point is possible so that the melting point of this substance is raised by addition of water-soluble, high molecular weight materials. The satisfactory percent of the addition is naturally dependent to a certain degree on the material to be dried, the type of material added and the desired degree of elevation of the melting point.

What is claimed is:

In the process of freeze drying aqueous solutions of foodstuff extracts wherein said solution of foodstuff is maintained during drying at a temperature sufficiently low to accomplish freezing of water therein and, at a temperature sufficiently high to provide for sublimation of said water substantially directly from the solid state to the vapor state with substantially no conversion of water to the liquid state during freeze drying, the improvement which comprises adding to said extract solution prior to freezing a sufficient amount of a water-soluble high molecular weight organic substance selected from the group consisting of gelatin, agar agar, pectin and polyvinyl pyrollidine to form a 0.2 to 2% concentration of said substance which substantially increases the eutectic point of the resulting solution, freezing said solution thus formed and then subjecting said solution to freeze drying.

References Cited in the file of this patent

R. J. C. Harris, Freezing and Drying, pages 234–5, New York, 1954.

The Concentrating and Drying of Citrus Juices (Article), 1945, Proceedings of Institute of Food Technologists by Moore et al.